US010841666B1

(12) United States Patent
Effinger et al.

(10) Patent No.: US 10,841,666 B1
(45) Date of Patent: Nov. 17, 2020

(54) GENERATION OF POINTS OF INSERTION OF DIRECTED CONTENT INTO A VIDEO ASSET

(71) Applicant: Amazon Technologies, Inc., Seattle, WA (US)

(72) Inventors: Charles Effinger, Los Angeles, CA (US); Ryan Barlow Dall, Los Angeles, CA (US); Christian Garcia Siagian, Los Angeles, CA (US); Jonathan Y Ito, San Gabriel, CA (US); Brady Court Tsurutani, Santa Monica, CA (US); Vadim Volovik, Santa Monica, CA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 16/835,754

(22) Filed: Mar. 31, 2020

(51) Int. Cl.
   *H04N 21/845* (2011.01)
   *G06N 20/00* (2019.01)
   *G06K 9/00* (2006.01)

(52) U.S. Cl.
   CPC ..... *H04N 21/8455* (2013.01); *G06K 9/00718* (2013.01); *G06K 9/00744* (2013.01); *G06N 20/00* (2019.01); *H04N 21/8456* (2013.01)

(58) Field of Classification Search
   CPC ........... H04N 21/8455; H04N 21/8456; G06N 20/00; G06K 9/00718; G06K 9/00744
   See application file for complete search history.

(56) References Cited

U.S. PATENT DOCUMENTS

| 9,886,867 | B2* | 2/2018 | Baphna | G09B 7/00 |
|---|---|---|---|---|
| 10,446,170 | B1* | 10/2019 | Chen | G06F 17/18 |
| 10,572,778 | B1* | 2/2020 | Robinson | G06K 9/00711 |
| 2011/0129199 | A1* | 6/2011 | Del Sordo | H04N 21/435 |
| | | | | 386/241 |
| 2020/0090661 | A1* | 3/2020 | Ackerman | G06F 40/35 |

\* cited by examiner

*Primary Examiner* — Mishawn N. Hunter
(74) *Attorney, Agent, or Firm* — Eversheds Sutherland (US) LLP

(57) ABSTRACT

Technologies are provided for generation of points of insertion of directed content into a video asset. In some embodiments, multiple time offsets within an interval spanned by the video asset can be determined using audio data corresponding to the video asset. A time offset defines a boundary between first and second segments of the video asset. Using image data corresponding to the video asset, respective pairs of video clips for the multiple time offsets can be generated. Visual features, aural features, and language features pertaining to the respective pairs of video clips can then be generated. Scores for the multiple time offsets can be generated using the visual features, the aural features, and the language features. A score represents an assessment of suitability to insert directed content into the video asset at a time offset. A file that contains specific time offsets can be generated.

20 Claims, 7 Drawing Sheets

GENERATION OF POINTS OF INSERTION OF DIRECTED CONTENT INTO A VIDEO ASSET

BACKGROUND

Some online platforms allow end-users to view movies and television shows free of charge. Advertising is one source of revenue that can support such a free service. Thus, to provide desirable digital media (movies or television shows, for example) at no cost to an end-user, paid advertisements can be sequentially displayed as the digital media is presented to the end-user. Timestamps retained in a so called "cue point file" can determine the instants at which advertisements can be displayed during the presentation of the digital media. A manual approach is typically utilized to generate cue point files. A human agent watches digital content and determines timestamps believed to be adequate for insertion of an advertisement. These human-created cue-point files can be provided either by a source of the digital media or by a third-party vendor specialized in producing such cue point files.

Timestamps that dictate insertion of advertisements at adequate instants during presentation of digital media can result in the inclusion of advertisements being perceived as an acceptable burden in exchange for consumption of free digital content. However, timestamps that cause the insertion of advertisement at poorly timed instants can lead to a diminished customer viewing experience.

Therefore, improved technologies for generation of cue point files for insertion of content into digital media may be desired.

BRIEF DESCRIPTION OF THE DRAWINGS

The accompanying drawings are an integral part of the disclosure and are incorporated into the subject specification. The drawings illustrate example embodiments of the disclosure and, in conjunction with the description and claims, serve to explain at least in part various principles, features, or aspects of the disclosure. Certain embodiments of the disclosure are described more fully below with reference to the accompanying drawings. However, various aspects of the disclosure can be implemented in many different forms and should not be construed as limited to the implementations set forth herein. Like numbers refer to like elements throughout.

FIG. 3 also depicts examples of segments of the video asset.

DETAILED DESCRIPTION

The disclosure recognizes and addresses, amongst other technical challenges, the issue of determining satisfactory points within a video asset for insertion of directed content. Embodiments of the disclosed technologies, individually or in a particular combination, can be used for generation of such points within a video asset. The disclosed technologies can determine candidate points for the insertion of directed content into the video asset by analyzing audio data corresponding to the video asset. The audio data can be embedded into or otherwise synchronized with the video asset. The disclosed technologies can then analyze a limited amount of video content associated with a candidate content insertion point. The video content corresponds to both (i) first video frames and a first audio segment within a time interval prior to the candidate content insertion point, and (ii) second video frames and a second audio segment within another time interval after the candidate content insertion point. As a result of the analysis of that video content, the disclosed technologies can generate a score that characterizes a degree of smoothness of a scene transition about the candidate content insertion point. In other words, the score represents the suitability of the candidate content insertion point as a point of insertion of directed content. Here, directed content refers, for example, to digital media configured for a particular audience and/or a particular outlet channel, such as a website, a streaming service, or a mobile application. Directed content can include, for example, any type of digital media, such as advertisement; surveys; motion pictures, animations, or other types of video segments; video games; podcasts; audio segments of defined durations (ringtones, songs, etc.); and similar digital content.

In some instances, a candidate content insertion point that has a score that meets or exceeds a threshold value can be deemed satisfactory for insertion of directed content into the video asset. The disclosed technologies can generate records identifying respective satisfactory content insertion points. The disclosed technologies also can retain those records in data storage for use in insertion of directed content into a video asset during consumption of the video asset. In some configuration, the disclosed technologies can generate a file containing the satisfactory content insertion points. The file can be associated with the video asset and can serve as a cue point file. The file can be used for insertion of directed content into the video asset during consumption of the video asset. In contrast to commonplace approaches, the disclosed technologies can generate such records without reliance on human analysis.

Figure 1:
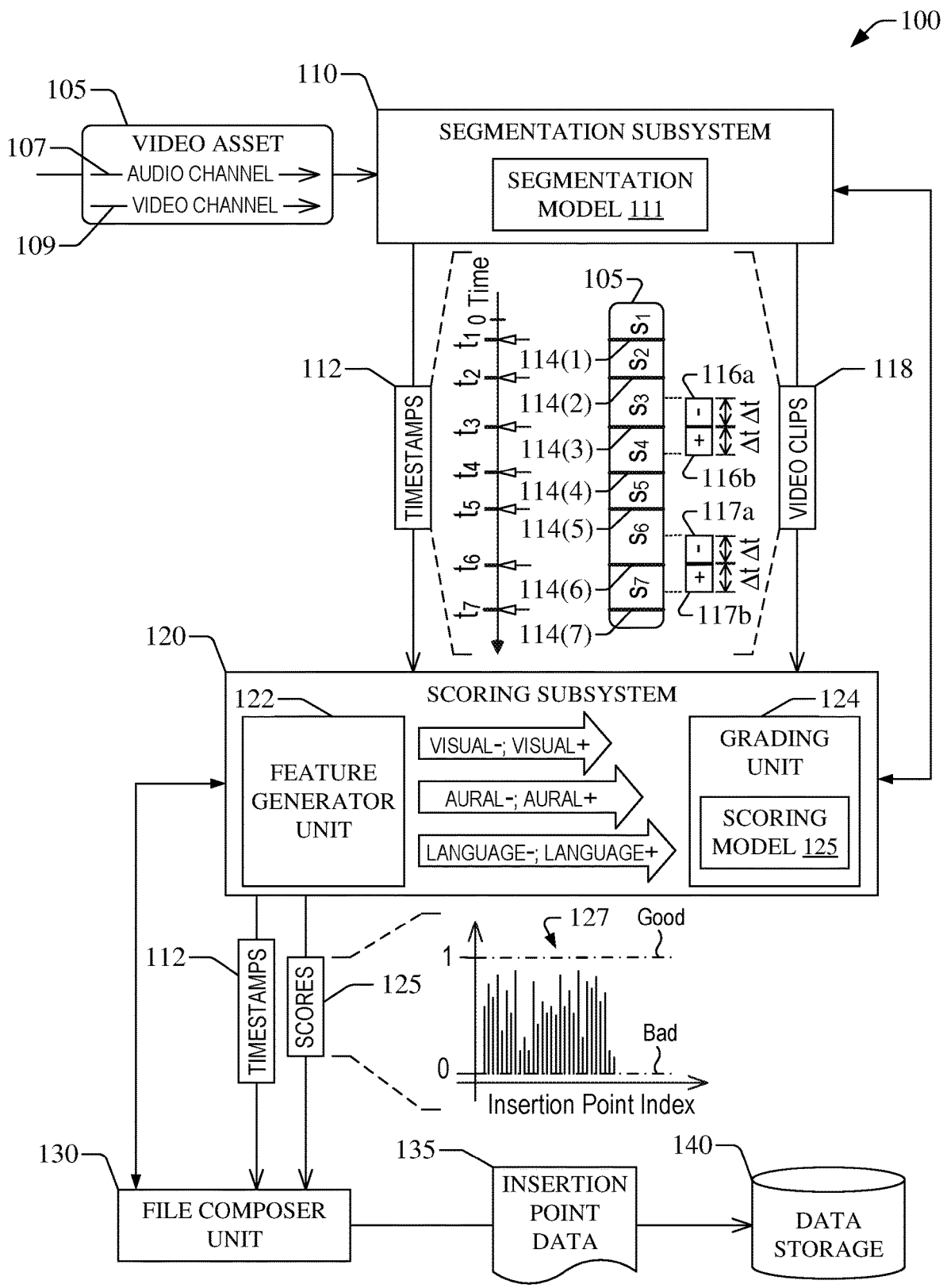
FIG. 1 illustrates an example of an operational environment for generation of points of insertion of directed content into a video asset, in accordance with one or more embodiments of this disclosure.

With reference to the drawings, FIG. 1 is a schematic block diagram of an example of an operational environment 100 for generation of content insertion points within a video asset 105, in accordance with one or more embodiments of this disclosure. The video asset 105 contains digital video content that spans a defined time interval. The digital video content can include digital media, such as a feature motion picture (live action feature movie or animation feature movie), a short film, an episode of a television show, a documentary, or similar. As an example, the defined time interval can be one of 120 minutes, 60 minutes, 40 minutes, or 30 minutes. The video asset 105 can be consumed as a time-shifted stream of content sent to an endpoint device via a network (neither the device nor the network is shown in FIG. 1). The digital video content can originate from various sources, such as a video streaming service or a broadcasting network platform.

A content insertion point refers to a time offset within the time span of the video asset 105, where the time offset identifies a time during consumption of the video asset 105 that can be suitable for insertion of directed content into the video asset 105. The directed content that can be inserted into the video asset 105 refers, for example, to digital media configured for a particular audience and/or a particular outlet channel, such as a website, a streaming service, or a mobile application.

The video asset 105 can be formatted according to one or several multimedia formats, such as WAV, MP3, MP4, FLAC, or similar. Regardless of its particular format, the video asset 105 can include an audio channel 107 and a video channel 109. The video channel 109 carries image data corresponding to the digital video content of the video asset 105. The audio channel 107 carries audio data corresponding to the video asset 105. The audio data can be synchronized with the digital video content contained in the video asset 105, for example. One or several other audio channels also can be embedded in the video asset 105. In some configurations, the audio channel 107 can contain an original natural language of production of the video asset 105, and the other audio channel(s) can contain respective second natural languages. For instance, the other audio channel(s) can contain a dubbed version of the original natural language.

Figure 2A:
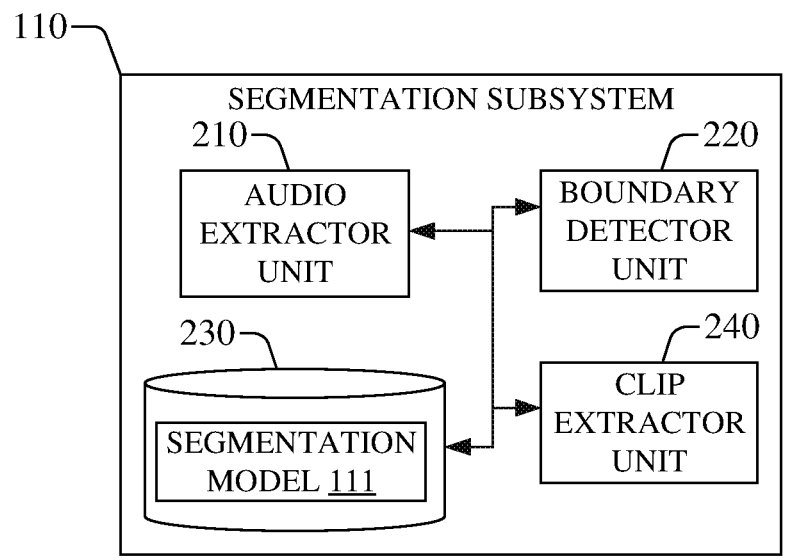
FIG. 2A illustrates an example of a subsystem for determining candidate cue points for insertion of directed content into a video asset, in accordance with one or more embodiments of this disclosure.

The operational environment 100 includes a segmentation subsystem 110 than can acquire the audio channel 107 and the video channel 109. The segmentation subsystem 110 can analyze the audio data carried in the audio channel 107 to partition the video asset into segments. To that end, the segmentation subsystem 110 can apply a machine-learning model 111 to the audio data to identify portions of the digital media in the video asset 105 that are softer in volume than other portions of the digital media. Such a machine-learning model 111 can be referred to as a segmentation model. Each of those softer and louder portions constitute a segment of the video asset 105. In some embodiments, as is illustrated in FIG. 2A, the segmentation subsystem 110 can include an audio extractor unit 210 that can acquire the audio channel 107 and the audio data carried in that channel. In addition, the segmentation subsystem 110 can include a boundary detector unit 220 that can apply the machine-learning model 111 to the audio data. The machine-learning model 111 can be retained in one or more memory devices 230.

Figure 2B:
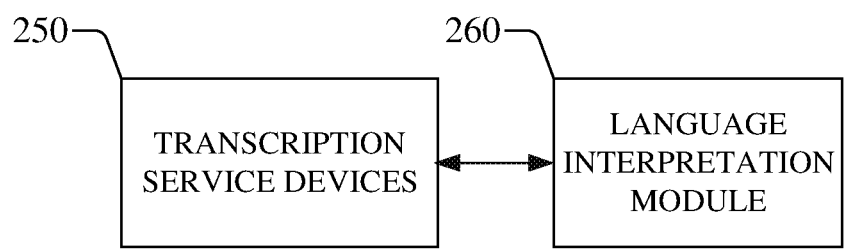
FIG. 2B illustrates an example of a subsystem for determining language features for insertion of directed content into a video asset, in accordance with one or more embodiments of this disclosure.
Figure 3:
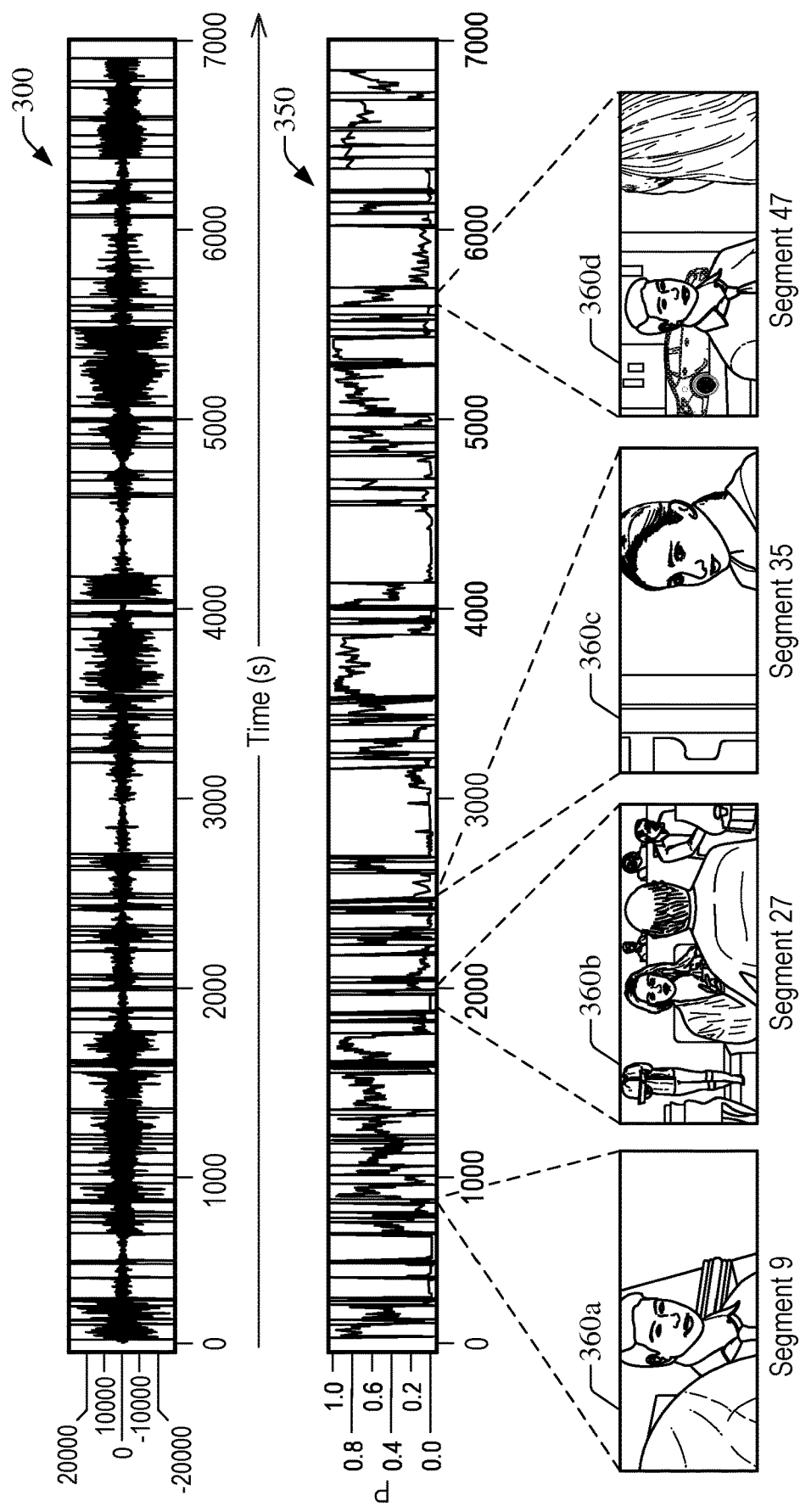
FIG. 3 illustrates an example of an audio waveform for an example video asset and a probability of the waveform corresponding to loud audio at a particular time, in accordance with one or more embodiments of this disclosure.

Simply as an illustration, diagram 300 in FIG. 3 depicts an example of an audio waveform defined by audio data carried in the audio channel 107 of an example feature motion picture. The running time of the feature motion picture is approximately 6900 seconds. Diagram 350 in FIG. 3 presents the probability (denoted by P) predicted by the machine-learning model 111 that the waveform corresponds to loud audio, as function of time during the running time of the example feature motion picture. The boundary detector unit 220 (FIG. 2) can identify time intervals having a probability less than a defined threshold value (e.g., 0.2 or 0.3) as a softer-audio segment. The boundary detector unit 220 can identify other time intervals having a probability that meets or exceeds the defined threshold value as louder-audio segments. In such a fashion, segmentation subsystem 110 can partition the example feature motion picture into 55 segments, for example. As an example, diagram 360*a* schematically depicts a video frame of segment 9; diagram 360*b* schematically depicts a video frame of segment 27; diagram 360*c* schematically depicts a video frame of segment 35; and diagram 360*d* schematically depicts a video frame of segment 47.

As a result of partitioning the video asset 105, adjacent segments correspond to portions of digital media having respective volume characteristics. Specifically, a first segment of the adjacent segments corresponds to a portion of the digital media that is soft in volume, and a second segment of the adjacent segments correspond to a portion of the digital media that is loud in volume. Without intending to be bound by theory and/or modeling, based on unique properties of storytelling associated with the digital media, softer segments typically correspond to conversations because background audio tends to be minimized in order to render dialogues between actors easier to hear during playback of the video asset 105.

As is illustrated in FIG. 1, adjacent segments are separated by a discrete time boundary defined by a timestamp. Rather than being an absolute time during presentation of the video asset 105, the timestamp identifies a time offset defining time interval elapsed from the beginning of the video asset 105. Such a boundary represents a transition between segments. In some instances, the transition between segments constitutes a transition between scenes.

Thus, by partitioning the video asset 105 into segments, the segmentation subsystem 110 can generate a series of timestamps 112 including N timestamps $\{t_1, t_2, t_3, t_4, t_5, \ldots, t_{N-1}, t_N\}$. The number N (a natural number) of timestamps can be specific to the type digital media contained in the video asset 105 and the duration of the video asset 105. For instance, the number of timestamps 112 for a horror feature motion picture may be greater than for a family-oriented feature motion picture. For the sake of simplification of the discussion set forth herein, a case with N=7 is depicted in FIG. 1.

Each one of the timestamps 112 represents a candidate content insertion point for the video asset 105. Because the candidate insertion points can be determined by analysis of audio data, the processing time incurred to determine the candidate content insertion points can be significantly less than the processing time that would be incurred to accomplish the same task using commonplace video-based techniques.

For each candidate content insertion point, the segmentation subsystem 110 can select digital video content corresponding to a defined time interval ΔT about the transition for the candidate content insertion point. For instance, ΔT can be one of 20 s, 30 s, or 40 s. The digital video content corresponds to both (i) first video frames and first audio segment prior to such a transition and (ii) second video frames and second audio segment after such a transition. The segmentation subsystem 110 can then generate a pre-transition video clip and a post-transition video clip. The pre-transition video clip includes the first video frames and the first audio segment. The post-transition video clip includes the second video frames and the second audio segment. In some embodiments, as is illustrated in FIG. 2, the segmentation subsystem 110 can include a clip extractor unit 240 that can select video frames and audio segments boundaries in the video asset 105. The clip extractor unit 240 can then generate pre-transition video clips and post-transition video clips using the selected video frames and audio segments, in accordance with aspects described above.

In some configurations, the selected digital video content corresponds to both (i) first video frames and a first audio segment within a time interval Δt prior to a candidate content insertion point and (ii) second video frames and a second audio segment within a time interval Δt after the candidate content insertion point. In those configurations, ΔT=2Δt. Simply for purposes of illustration, as is depicted in FIG. 1, for the transition 114(3) corresponding to timestamp $t_3$, a first digital video content 116a prior to such a transition is represented with a block marked with a "−" sign. The first digital video content 116a corresponds to a section of segment $s_3$ in the video asset 105. Second digital video content 116b after such a transition is represented with a block marked with a "+" sign. The second digital content 116b corresponds to a section of segment $s_{3+1}=s_4$ in the video asset 105. The segmentation subsystem 110 can select the first digital video content 116a and the second digital video content 116b. The segmentation subsystem 110 can then generate respective video clips for those two types of digital video contents: A pre-transition video clip including the first digital video content 116a and a post-transition video clip including the second digital video content 116b.

Similarly, continuing with the illustration depicted in FIG. 1, for the transition 114(6) corresponding to timestamp $t_6$, first digital video content 117a prior to such a transition also is represented with a block marked with a "−" sign. The first digital video content 117a corresponds to a section of segment $s_6$ in the video asset 105. Second digital video content 117b after such a transition also is represented with a block marked with a "+" sign. The second digital content 117b corresponds to a section of segment $s_{6+1}=s_7$ in the video asset 105. The segmentation subsystem 110 can select the first digital video content 117a and the second digital video content 117b. The segmentation subsystem 110 can then generate respective video clips for those two types of digital video contents: A pre-transition video clip including the first digital video content 117a and a post-transition video clip including the second digital video frames 117b. Although not depicted in FIG. 1, the segmentation subsystem 110 can generate pre-transition and post-transition video clips for each of one of transition 114(1), transition 114(2), transition 114(4), transition 114(5), and transition 114(7).

The segmentation subsystem 110 can send timestamps 112 and video clips 118 to a scoring subsystem 120 included in the operational environment 100. As mentioned, the timestamps 112 define multiple candidate content insertion points. As also mentioned, the video clips 118 include pre-transition and post-transition video clips for each one of the multiple candidate content insertion points.

The scoring subsystem 120 that can evaluate multiple candidate content insertion points determined by the segmentation subsystem 110. To that end, the scoring subsystem 120 can analyze the video clips 112 and can score the candidate content insertion points based on results of the analysis. More specifically, the scoring subsystem 120 includes a feature generator unit 122 that can determine various types of features pertaining to pre-transition and post-transition video clips, for each one of the multiple candidate insertion points. Those types of features can include visual features, aural features, language features, or a combination thereof.

Visual features include, in some configurations, aggregated features computed using neural network pre-trained for image recognition, for each one of the images in a video clip, sampled every second, for example. Aggregated features result, in some cases, from averaging defined image features for each one of the images in the video clip. In some embodiments, the neural network is embodied in a deep convolutional neural network including thirteen convolution layers and three fully-connected layers. In those embodiments, the features that are aggregated are determined at a last convolution layer of such a neural network. The visual features encode, for example, the contrasting backgrounds and/or characters in a before scene relative to an after scene.

It is noted that the disclosed technologies are not limited to such a type neural network and, in some embodiments, other pre-trained neural networks can be utilized to generate visual features. As such, other forms of aggregation can be implemented to generate aggregated visual features. In one embodiment, a visual transformer model can be applied to regions of interest for each one of the images in a video clip (pre-transition video clip or post-transition video clip). As a result, first embeddings (or vectors) for groups of regions of interest of the pre-transition video clip can be generated to summarize image features of such a video clip. Each one of those groups corresponding to a video frame, for example. In addition, second embeddings (or vectors) for groups of regions of interes of the post-transition video clip can be generated to summarize image features of such a video clip. Again, each one of the groups corresponding to a video frame. The feature generator unit 122 can apply the visual transformer model to generate such aggregated features. The visual transformer model can be included in the feature generator unit 122 in some embodiments.

Aural features include, for example, time-domain features and frequency-domain features. Examples of time-domain features include energy features, such as short-term energy, and zero-crossing rate (ZCR). An example of frequency-domain features includes Mel frequency spectral coefficient (MFCC), power spectral distribution, and spectral centroid. Both the time-domain features and frequency-domain features can be aggregated audio features that are sampled every second. In some configurations, for each sample, audio features are determined over a 20 ms interval. For example, 320 sample points off of a 16000 Hz signal can be utilized to determine aggregated audio features. Aggregated audio features can thus result, in some cases, from averaging the sampled audio features. The feature generator unit 122 can generate such aggregated features.

Other forms of aggregation also can be implemented. In one embodiment, an aural transformer model can be applied to samples of time-domain features or samples of frequency-domain features, where the samples constitute a sequence of features. As a result, first embeddings (or vectors) for respective samples of the pre-transition video clip can be generated to summarize audio features of such a video clip. In addition, second embeddings (or vectors) for respective samples of the post-transition video clip can be generated to summarize audio features of such a video clip. The feature generator unit 122 can apply the aural transformer model to generate such aggregated features. The aural transformer model can be included in the feature generator unit 122 in some embodiments.

Language features include, for example, output features from the last encoder layer of a pre-trained language representation model, such as a bidirectional encoder representation for transformers (BERT). Input to the pre-trained language representation model includes a transcription of the audio segment contained in a video clip (the pre-transition video clip or the post-transition video clip). Speech-to-text service device(s) (not depicted in FIG. 1) can generate the transcription using audio data defining the audio segment. Those device(s) can apply one or several speech recognition techniques to the audio data to generate the transcription. In some embodiments, as is illustrated in FIG. 2B, the speech-to-text service device(s) can be part of transcription service devices 250. At least one of the transcription service devices 250 can receive the audio segment contained in the video clip and can generate the transcription. The transcription can be sent to a language interpretation module 260 that can generate language features by applying the pre-trained language representation model to the transcription.

In some embodiments, the language interpretation model 260 can classify language features, resulting in one or more aggregated language features representing or summarizing the respective audio segments in pre-transition and post-transitions video clips. For example, the aggregated features can summarize a mood of the scene corresponding to the pre-transition video clip, and another mood of the scene corresponding to the post-transition video clip.

Because a satisfactory scene transition can encompass a change in plot and scenery between adjacent scenes, including introduction and credit scenes, the feature generator unit 122 can determine visual features, aural features, and language features for each of a pre-transition video clip and a post-transition video clip for a candidate transition. Thus, those types of features can be determined during the time interval Δt prior to and after a candidate transition. The order of magnitude of Δt can be tens of seconds in some configurations. Accordingly, substantial representation from each side of the candidate transition can be incorporated into the feature analysis. In some embodiments, the feature generator unit 122 can exclude essentially blank frames (or images) from the generation of visual, aural, and verbal features.

The scoring subsystem 120 can include a grading unit 124 that can determine scores 125 for respective candidate content insertion points using visual, aural, and verbal features associated with the respective candidate content insertion points. Each one of the scores 125 can characterize a degree of smoothness of a scene transition about a respective candidate content insertion point. As such, a score represents a suitability of a candidate content insertion point as a defined time for insertion of directed content into the video asset 105. The score can range from a first defined value to a second define value. The first defined value identifies a candidate content insertion point corresponding to a bad transition. The second defined value identifies a candidate insertion point corresponding to a good transition. Simply as an illustration, the first defined value can be 0 and the second defined value can be one of 1, 10, or 100. Diagram 127 in FIG. 1 schematically depicts scores between 0 and 1 for multiple candidate content insertion points identified by respective insertion point indices. An insertion point index identifies the position of a candidate content insertion point within the set of multiple candidate content insertion points.

Accordingly, for each transition corresponding to a candidate content insertion point, the grading unit 124 can receive first visual features pertaining to a pre-transition clip (those features represented with "Visual −" in FIG. 1). The grading unit 124 also can receive second visual features pertaining to a post-transition clip (those features represented with "Visual +" in FIG. 1). The grading unit 124 can further receive first aural features pertaining to the pre-transition clip (the features labeled as "Aural −" in FIG. 1) and second aural features pertaining to the post-transition clip (the features labeled as "Aural +" in FIG. 1). Furthermore, the grading unit 124 can receive first verbal features pertaining to the pre-transition clip (the features labeled as "Language −" in FIG. 1) and second verbal features pertaining to the post-transition clip (the features labeled as "Language +" in FIG. 1).

The grading unit 124 can then apply a machine-learning model 125 to the received visual features, aural features, and verbal features for pre-transition and post-transition clips for the multiple candidate content insertion points defined by the timestamps 112. In one configuration, as is shown in FIG. 1, the machine-learning model 125 is a scoring model that defines a particular type of neural network, such as a convolutional neural network (CNN). Simply as an illustration, the CNN can include a few hidden layers of neurons (e.g., one hidden layer of neurons, two hidden layers of neurons, or three hidden layers of neurons). When present, two hidden layers of the CNN can be partially connected or fully connected. The scoring model is trained on audio data, image data, and verbal data from video assets and corresponding human-generated cue point files.

The scores 125 are thus determined collectively for the multiple candidate content insertion points defined by the timestamps 112. Such a determination can provide scores that reflect both individual optimization of groups of multiple candidate content insertion points and collective optimization of such groups. Individual optimization can minimize "jarring" from switching to directed content (e.g., an advertisement). In other words, a candidate content insertion point that does not disrupt the flow of video content as a result of incorporating black frames or other visual transitions can be prioritized, and, thus, can be assigned a greater score. Collective optimization can prioritize, for example, candidate content insertion points that are separated by significant time in order to avoid overloading a particular section of the video asset 105 with directed content.

As is illustrated in FIG. 1, the scoring subsystem 120 can send scores 125 to a file composer unit 130 included in the operational environment 100. The scores 125 can be sent via the grading unit 124, for example. The file composer unit 130 can identify, using the scores 125, two or more candidate content insertion points having respective scores that individually meet or exceed a defined threshold. In one example, the defined threshold can be 0.7, 0.8 or 0.9. In another example, the defined threshold can be 70, 80, or 90. The magnitude of the defined threshold is based on the range of magnitudes of the scores 125. Those two or more candidate content insertion points can be deemed satisfactory for insertion of directed content into the video asset 105.

The file composer unit 130 can generate insertion point data 135 identifying satisfactory content insertion points, and can retain the insertion point data 135 in data storage 140. In one configuration, the file composer unit 130 can generate a file containing the insertion point data 135 and can retain the file in the data storage 140. The file can be associated with the video asset, and can be used for insertion of directed content into the video asset during playback.

In some embodiments, the file composer unit 130 can select specific content insertion points from a group of satisfactory content insertion points prior to generating insertion point data. The selected content insertion points can be used for insertion of directed content into the video asset 105. By selecting those specific content insertion points, a sequence of presentation of directed content during consumption of the video asset 105 can be regularized. As a result, the perceived quality-of-service of consumption of the video asset 105, in the presence of directed content, can be improved.

Figure 4:
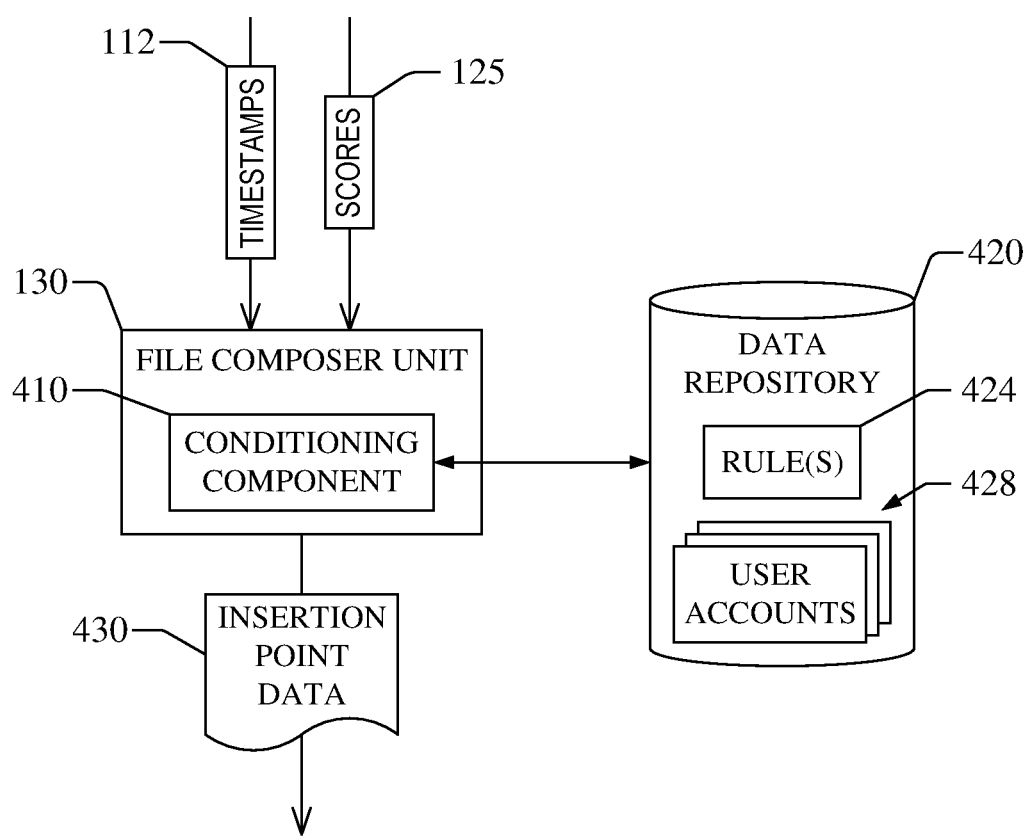
FIG. 4 illustrates an example of another operational environment for generation of points of insertion of directed content into a video asset, in accordance with one or more embodiments of this disclosure.

To select a content insertion point from a group of satisfactory candidate content insertion points, the file composer unit 130 can operate on the group of satisfactory content insertion points. In one embodiment, the file composer unit 130 can include a conditioning unit 410 that can apply a selection rule to the group of satisfactory candidate content insertion points. The rule can dictate that content insertion points essentially evenly distributed in time can be selected. In one example, such a rule can dictate that content insertion points separated in approximately five-minute intervals can be selected. In addition, or in another embodiment, the conditioning unit 410 can apply another selection rule to the group of satisfactory candidate content insertion points. That other selection rule can dictate that content insertion points occurring after a threshold time offset can be selected. As is illustrated in FIG. 4, the file composer unit 130 can include a conditioning component 410 that can apply one or many rules to the group of candidate content insertion points. The rule(s) can be retained in a data repository 420, within one or several memory elements 428 (referred to as rule(s) 424).

In addition, or in some instances, the file composer unit 130 can customize a group of satisfactory content insertion points using personalization data, such as end-user data. To that end, the file composer unit 130 can select a defined number of content insertion points from the group of satisfactory content insertion points. The defined number of content insertion points can be specific to an end-user. As such, file composer unit 130 can generate insertion point data for the video asset 105 dynamically, in response to an end-user that can consume the video asset 105. In some embodiments, as is illustrated in FIG. 4, the conditioning unit 410 can acquire end-user data from the data repository 420. The end-user data can be retained in user accounts 428.

The file composer unit 130 can generate insertion point data 430 defining select content insertion points corresponding to the video asset 105. The file composer unit 130 can generate a file containing insertion point data 430. In some embodiments, the file composer unit 130 also can generate metadata identifying an end-user. The file composer unit 130 can add the metadata to the generated file in order to create a correspondence between the insertion point data 430 and the end-user. The added metadata can be used to personalize directed content to be presented at the content insertion points identified in the file.

Back to FIG. 1, in some instances, human-generated content insertion points are available for the video asset 105. In those instances, the segmentation subsystem 110 can generated pre-transition video clips and post-transition video clips for human-generated timestamps corresponding to the human-generated content insertions points. The scoring subsystem 110 can then generate scores for the human-generated content insertion points, in accordance with aspects described herein. In addition, the segmentation subsystem 110 can generate timestamps 112 and video clips 118 for the video asset 105. The scoring subsystem 120 can then generate scores 125. The file composer unit 130 can then compare scores 125 with the scores corresponding to the human-generated content insertion points. A score comparison that yields a difference meeting or exceeding a threshold value can cause the human-generated content insertion point to be replaced with a satisfactory content insertion points generated in accordance with the technologies of this disclosure.

Figure 5:
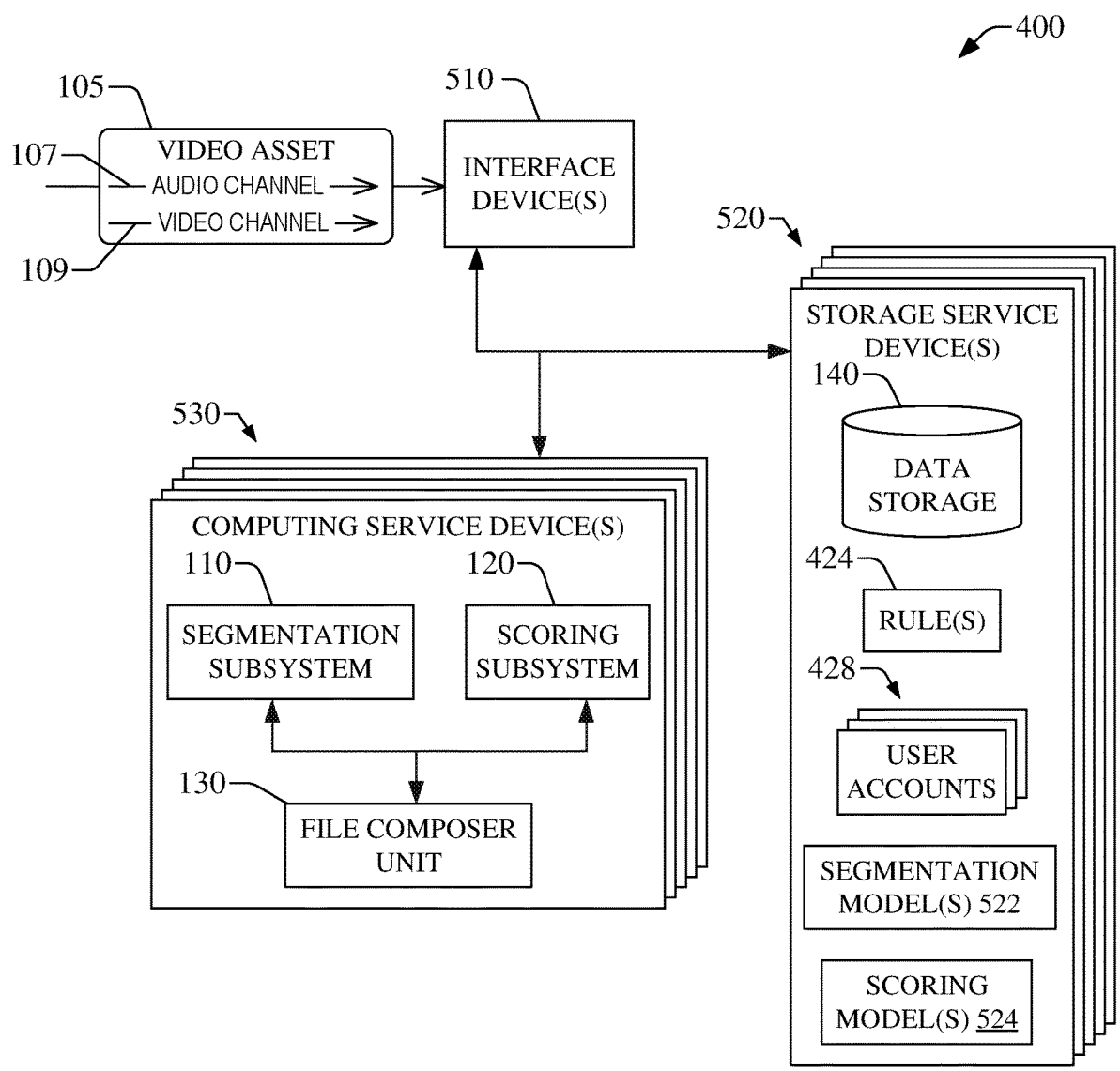
FIG. 5 illustrates an example of a computing system for generation of points of insertion of directed content into a video asset, in accordance with one or more embodiments of this disclosure.

FIG. 5 is a schematic block diagram of an example of a computing system 500 for the generation of cue points for insertion of directed content into a video asset, in accordance with one or more embodiments of this disclosure. The computing system 500 can generate a series of timestamps (e.g., timestamps 112, FIG. 1) using audio data corresponding to the video asset 105. Each one of the timestamps corresponds to a candidate content insertion point for the insertion of directed content into the video asset 105. Such a series can be generated by applying a segmentation model to audio data included in an audio channel 107 of the video asset 105. The computing system 500 can then analyze video content associated with a candidate content insertion point. The video content corresponds to both (i) first video frames and first audio segment prior to the content transition corresponding to the candidate content insertion point and (ii) second video frames and second audio segment after such a transition.

As a result of the analysis of such image data, the computing system 500 can generate a score that represents the suitability of the candidate content insertion point as a point of insertion of directed content into the video asset 105. As mentioned, a candidate content insertion point that has a score that meets or exceeds a threshold value can be deemed satisfactory for insertion of directed content (e.g., an advertisement or a survey) into the video asset 105. The computing system 500 can generate a file, for example, containing satisfactory content insertion points. The file can be associated with the video asset 105, and can be used for insertion of directed content into the video asset 105 during presentation of video content contained in the video asset 105.

The example computing system 500 includes one or many interface devices 510 that can receive the video asset 105 from a source of video content (not depicted in FIG. 5). The interface devices 510 can include one or many processors functionally coupled to one or many memory devices that can retain a data collection module or another type of content ingestion component (neither one depicted in FIG. 5). In some configurations, the data collection module can include an application programming interface (API) and/or another type of program code that can permit receiving the video asset 105 via a function call, for example. At least one of such processor(s) can execute the data access module to receive the video asset 105. At least one of the interface devices 510 can send the audio data carried in the audio channel 107 and the image data carried in the video channel 109 to one or many computing service devices 530 included in the computing system 500.

As is illustrated in FIG. 5, in some embodiments, the computing service device(s) 530 can include the segmentation subsystem 110 and the scoring subsystem 120. The computing service device(s) 530 also can include the file composer unit 130. Each one of those subsystems and unit can operate in accordance with functionality described herein in connection with the generation of cue points for insertion of directed content into a video asset.

At least one of the computing service device(s) 530 can be functionally coupled to one or many storage devices 520. The coupling can be direct or can be mediated by at least one of the interface device(s) 510. The storage service device(s) 520 include data and metadata that can be used to implement the functionality described herein in connection with the generation of cue points for insertion of directed content into a video asset. At least one of the storage service device(s) 520 can embody, or can include, the data storage 140. At least another one of the storage service device(s) 520 can embody, or can include, the data repository 420. Thus, as is illustrated in FIG. 5, the storage service device(s) 520 can retain the rule(s) 422 and user accounts 428 and/or other types of personalization data.

As is shown in FIG. 5, at least one of the storage service device(s) 520 also can retain data defining one or many trained machine-learning models 522 to detect boundaries separating different sections of a video asset, and second data defining one or many trained machine-learning models 524 to score a candidate content insertion point. The machine-learning model(s) 522 can include the segmentation model 111, and the machine-learning model(s) 524 can include the scoring model 125. While not shown in FIG. 5, in some embodiments, at least one of the storage service device(s) 520 also can retain data defining an visual transformer model and/or data defining an aural transformer model. Each one of those transformer models can be applied to generate aggregated features, as is described herein.

Figure 6:
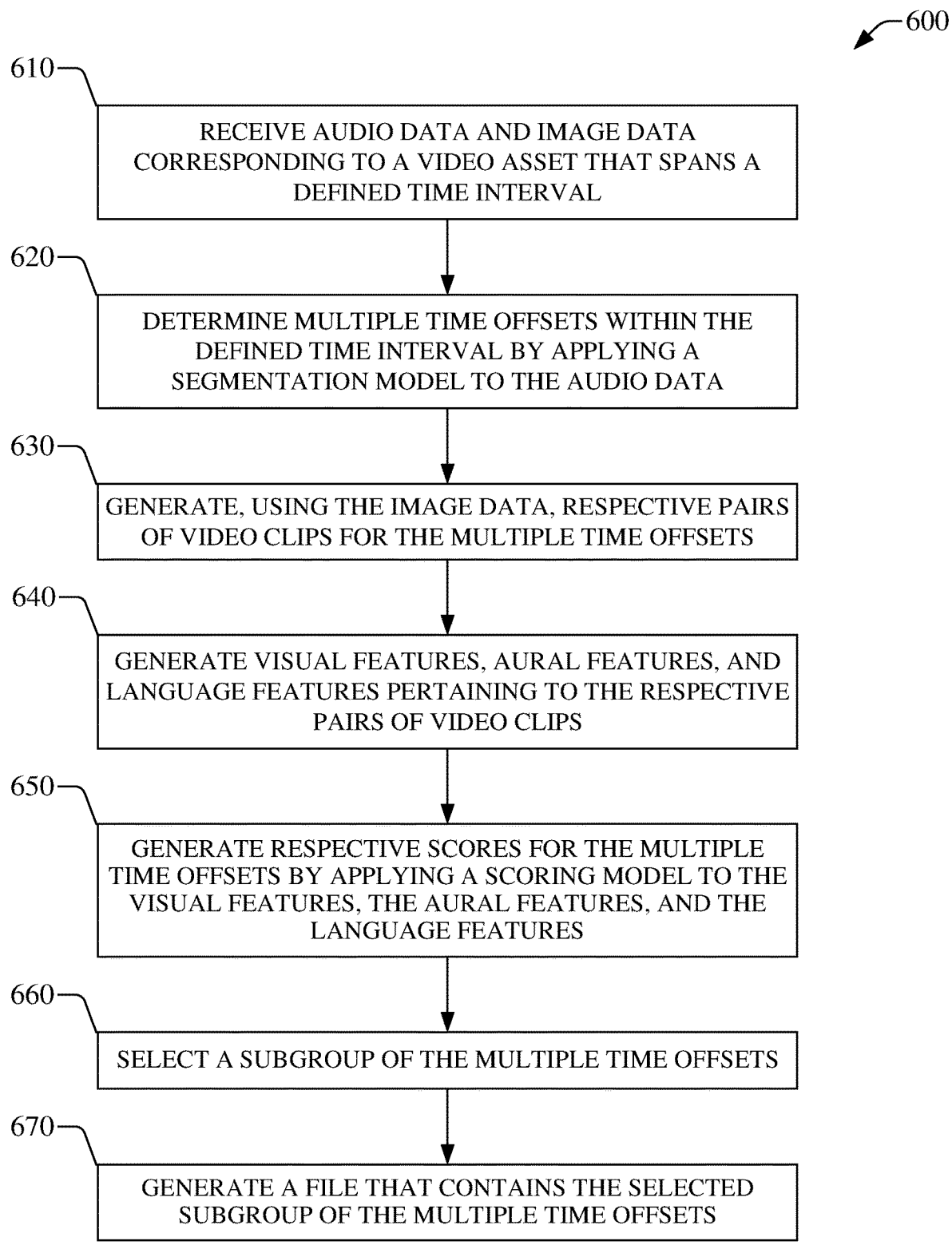
FIG. 6 illustrates an example of a method for generating points of insertion of directed content into a video asset, in accordance with one or more embodiments of this disclosure.

In view of the aspects of the techniques disclosed herein, an example method that can be implemented in accordance with the disclosure can be more readily appreciated with reference to the flowchart in FIG. 6. For purposes of simplicity of explanation, the example methods disclosed herein are presented and described as a series of blocks (with each block representing an action or an operation in a method, for example). However, it is to be understood and appreciated that the disclosed methods are not limited by the order of blocks and associated actions or operations, as some blocks may occur in different orders and/or concurrently with other blocks from that are shown and described herein. For example, the various methods or processes of the disclosure can be alternatively represented as a series of interrelated states or events, such as in a state diagram. Furthermore, not all illustrated blocks, and associated action(s), may be required to implement a method in accordance with one or more aspects of the disclosure. Further yet, two or more of the disclosed methods or processes can be implemented in combination with each other, to accomplish one or more functionalities and/or advantages described herein.

The methods of the disclosure can be retained on an article of manufacture, or computer-readable non-transitory storage medium, to permit or facilitate transporting and transferring such methods to a computing device (e.g., a desktop computer; a mobile computer, such as an electronic book reader (e-reader) or other tablets, or a smartphone; a gaming console, a mobile telephone; a blade computer; a programmable logic controller, and the like) for execution, and thus implementation, by a processor of the computing device or for storage in a memory thereof or functionally coupled thereto. In one aspect, one or more processors, such as processor(s) that implement (e.g., execute) one or more of the disclosed methods, can be employed to execute code instructions retained in a memory, or any computer- or machine-readable medium, to implement the one or more methods. The code instructions can provide a computer-executable or machine-executable framework to implement the methods described herein.

FIG. 6 is a flowchart of an example of a method 600 for generating points of insertion of directed content into a video asset, according to one or more embodiments of the disclosure. The video asset contains digital video content and spans a defined time interval. The digital video content can include digital media, such as a feature motion picture (live action feature movie or animation feature movie), a short film, an episode of a television show, a documentary, or similar. As mentioned, simply as an illustration, the defined time interval can be one of 120 minutes, 60 minutes, 40 minutes, or 30 minutes. The video asset can be embodied in, or can include, the video asset 105 (FIG. 1) in some embodiments.

The example method can be implemented, entirely or partially, by a computing system having various computing resources. The computing system has at least one processor and/or is functionally coupled to at least one processor that can implement (e.g., compile, execute, compile and execute, etc.) one or more blocks of the example method 600. The computing system also can include one or many memory devices, other types of computing resources, or a combination thereof. Such processor(s), memory device(s), and computing resource(s), individually or in a particular combination, can permit the computing system to implement the example method 600, entirely or partially. The computing resources can include operating system(s); software for configuration and/or control of a virtualized environment; firmware; CPU(s); GPU(s); TPU(s); virtual memory; disk space; interface(s) (I/O interface devices, programming interface(s) (such as APIs, etc.); controller devices(s); a combination of the foregoing; or similar. The computing resources available to the computing system also can include downstream communication bandwidth and/or upstream communication bandwidth.

In some scenarios, one or more blocks of the example method 500 can be implemented in a distributed fashion by two or more computing devices contained in the computing system. Each one of the two or more computing devices can have at least one processor or can be functionally coupled to at least one processor, where such processor(s) can implement at least one of the one or more blocks. The computing device(s) also can be memory device(s) and/or other computing resources. Regardless of the example method 600 being implemented by a distributed or non-distributed computing system, the at least one processor can be functionally coupled to at least one memory device or other types of computer-readable non-transitory storage media.

At block 610 the computing system can receive audio data and image data corresponding to the video asset. As mentioned, the video asset spans a defined time interval. The audio data can be carried in an audio channel embedded in the video asset. In some cases, the audio data can instead be synchronized with the video asset. The image data can be carried in a video channel embedded in the video asset.

At block 620, the computing system can determine multiple time offsets within the defined time interval by applying a segmentation model to the audio data. Each time offset of the multiple time offsets defines a boundary between a first segment of the video asset and a second segment of the video asset. The segmentation model can be embodied in, or can include, a machine-learning model that yields a probability of the first segment being a loud-volume portion of the digital feature motion picture and a probability of the second segment being a soft-volume portion of the video asset. See FIG. 2A as an example.

At block 630, the computing system can generate, using the image data, respective pairs of video clips for the multiple time offsets. At block 640, the computing system can generate visual features, aural features, and language features pertaining to the respective pairs of video clips.

At block 650, the computing system can generate respective scores for the multiple time offsets by applying a scoring model to the visual features, the aural features, and the language features. Each score of the respective scores represents an assessment of suitability to insert a video segment into the video asset at a time offset corresponding to the score. As is disclosed herein, the video segment that may be inserted can include directed content asset. In some cases, the video segment can include another type of secondary digital media besides directed content. Here, simply as an illustration, secondary digital media refers to digital media that is extrinsic to the digital media contained in the video asset.

At block 660, the computing system can select a subgroup of the multiple time offsets. In some embodiments, selecting the subgroup includes determine that a first defined time offset of the multiple time offsets has a defined score that exceeds a defined threshold value. In addition, or in other embodiments, selecting the subgroup of multiple time offsets can include generating a ranking of the respective scores, and determining a defined number of particular time offsets from the multiple time offsets that meet or exceed a threshold placement within the ranking. The selecting also can include identifying the defined number of particular time offsets as the subgroup of the multiple time offsets.

At block 670, the computing system can generate a file that contains the selected subgroup of the respective scores. The generated file can serve as a cue point file.

Figure 7:
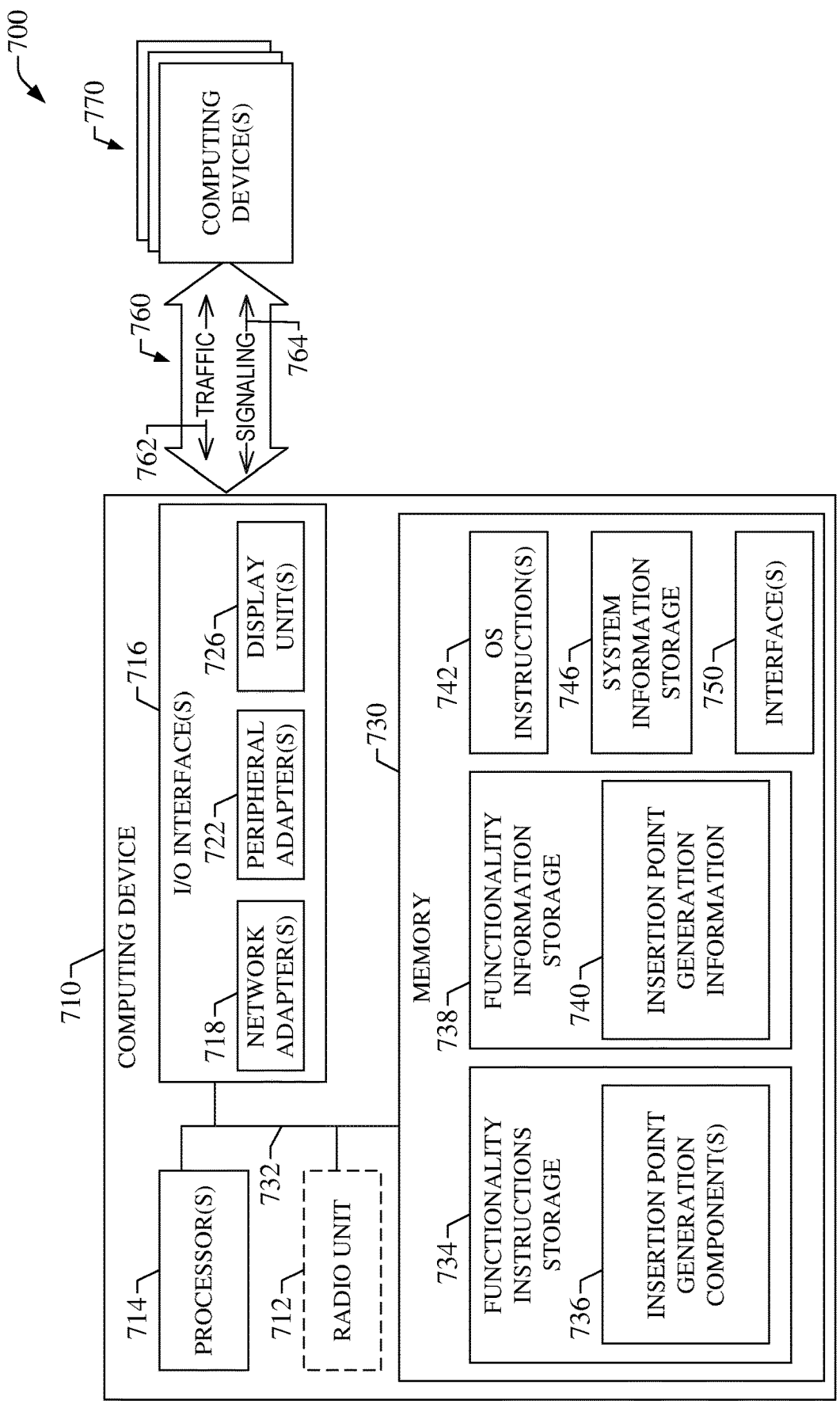
FIG. 7 illustrates an example of a computational environment for generation of points of insertion of directed content into a video asset, in accordance with one or more embodiments of the disclosure.

FIG. 7 illustrates a block diagram of an example computational environment 700 for generation of points of insertion of directed content into a video asset, in accordance with one or more aspects of the disclosure. The example computational environment 700 is merely illustrative and is not intended to suggest or otherwise convey any limitation as to the scope of use or functionality of the computational environment's architecture. In addition, the illustrative computational environment depicted in FIG. 7 should not be interpreted as having any dependency or requirement relating to any one or combination of components illustrated in the example operational environments of the disclosure. The example computational environment 700 or portions thereof can embody, or can include, for example, one or more of the operational environment 100 or the computing system 500.

The computational environment 700 represents an example implementation of the various aspects or elements of the disclosure in which the processing or execution of operations described in connection with the generation of points of insertion of directed content into a video asset disclosed herein can be performed in response to execution of one or many software components at the computing device 710. It should be appreciated that the one or many software components can render the computing device 710, or any other computing device that contains such components, a particular machine for generation of points of insertion of directed content into a video asset as is described herein, among other functional purposes. A software component can be embodied in or can include one or many computer-accessible instructions, e.g., computer-readable and/or computer-executable instructions. In one scenario, at least a portion of the computer-accessible instructions can embody and/or can be executed to perform at least a part of one or several of the example methods disclosed herein, such as the example method presented in FIG. 6.

For instance, to embody one such method, at least the portion of the computer-accessible instructions can be persisted (e.g., stored, made available, or stored and made available) in a computer storage non-transitory medium and executed by a processor. The one or more computer-accessible instructions that embody a software component can be assembled into one or more program modules, for example, that can be compiled, linked, and/or executed at the computing device 710 or other computing devices. Generally, such program modules include computer code, routines, programs, objects, components, information structures (e.g., data structures and/or metadata structures), etc., that can perform particular tasks (e.g., one or more operations) in response to execution by one or more processors, which can be integrated into the computing device 710 or functionally coupled thereto.

The various example embodiments of the disclosure can be operational with numerous other general purpose or special purpose computing system environments or configurations. Examples of well-known computing systems, environments, and/or configurations that can be suitable for implementation of various aspects or elements of the disclosure in connection with the generation of points of insertion of directed content into a video asset described herein can include personal computers; server computers; laptop devices; handheld computing devices; and multiprocessor systems. Additional examples can include set-top boxes, programmable consumer electronics, network personal computers (PCs), minicomputers, mainframe computers, blade computers, programmable logic controllers, distributed computing environments that include any of the above systems or devices, and the like.

As illustrated, the computing device 710 can include one or more processors 714, one or more input/output (I/O) interfaces 716, a memory 730, and a bus architecture 732 (also termed bus 732) that functionally couples various functional elements of the computing device 710. In certain embodiments, the computing device 710 can include, optionally, a radio unit 712. The radio unit 712 can include one or more antennas and a communication processing unit that can permit wireless communication between the computing device 710 and another device, such as one of the computing device(s) 770. The bus 732 can include at least one of a system bus, a memory bus, an address bus, or a message bus, and can permit exchange of information (data, metadata, and/or signaling) between the processor(s) 714, the I/O interface(s) 716, and/or the memory 730, or respective functional elements therein. In certain scenarios, the bus 732 in conjunction with one or more internal programming interfaces 750 (also referred to as interface(s) 750) can permit such exchange of information. In scenarios in which processor(s) 714 include multiple processors, the computing device 710 can utilize parallel computing.

The I/O interface(s) 716 can permit communication of information between the computing device and an external device, such as another computing device, e.g., a network element or an end-user device. Such communication can include direct communication or indirect communication, such as exchange of information between the computing device 710 and the external device via a network or elements thereof. As illustrated, the I/O interface(s) 716 can include one or many of network adapter(s) 718, peripheral adapter(s) 722, and rendering unit(s) 726. Such adapter(s) can permit or facilitate connectivity between the external device and one or more of the processor(s) 714 or the memory 730. For example, the peripheral adapter(s) 722 can include a group of ports, which can include at least one of parallel ports, serial ports, Ethernet ports, V.35 ports, or X.21 ports. In certain embodiments, the parallel ports can include General Purpose Interface Bus (GPM), IEEE-1284, while the serial ports can include Recommended Standard (RS)-232, V.11, Universal Serial Bus (USB), FireWire or IEEE-1394.

In one aspect, at least one of the network adapter(s) 718 can functionally couple the computing device 710 to one or many computing devices 770 via one or more traffic and signaling pipes 760 that can permit or facilitate exchange of traffic 762 and signaling 764 between the computing device 710 and the one or many computing devices 770. Such network coupling provided at least in part by the at least one of the network adapter(s) 718 can be implemented in a wired environment, a wireless environment, or both. The information that is communicated by the at least one of the network adapter(s) 718 can result from the implementation of one or more operations of a method in accordance with aspects of this disclosure. Such output can be any form of visual representation, including, but not limited to, textual, graphical, animation, audio, tactile, and the like. In certain scenarios, each one of the computing device(s) 770 can have substantially the same architecture as the computing device 710. In addition, or in the alternative, the display unit(s) 726 can include functional elements that can permit control of the operation of the computing device 710, or can permit revealing the operational conditions of the computing device 710. Such functional elements can include, for example, lighting devices, such as light-emitting diodes; a display device, such as a liquid crystal display (LCD), a plasma monitor, a light emitting diode (LED) monitor, or an electrochromic monitor; combinations thereof; or similar elements.

In one aspect, the bus 732 represents one or many of several types of bus structures, including a memory bus or a memory controller, a peripheral bus, an accelerated graphics port, and a processor or local bus using any of various bus architectures. As an illustration, such architectures can include an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, a Peripheral Component Interconnects (PCI) bus, a PCI-Express bus, a Personal Computer Memory Card International Association (PCMCIA) bus, a Universal Serial Bus (USB), and the like. The bus 732, and all buses described herein can be implemented over a wired or wireless network connection and each of the subsystems, including the processor(s) 714, the memory 730 and memory elements therein, and the I/O interface(s) 716 can be contained within one or more remote computing devices 770 at physically separate locations, connected through buses of this form, in effect implementing a fully distributed system. In certain embodiments, such a distributed system can implement the functionality described herein in a client-host or client-server configuration in which the insertion point generation component(s) 736 or the insertion point generation information 740, or both, can be distributed between the computing device 710 and at least one of the computing device(s) 770, and the computing device 710 and at least one of the computing device(s) 770 can execute such components and/or leverage such information.

The computing device 710 can include a variety of computer-readable media. Computer-readable media can be any available media (transitory and non-transitory) that can be accessed by a computing device. In one aspect, computer-readable media can include computer non-transitory storage media (or computer-readable non-transitory storage media) and communications media. As such, computer-readable non-transitory storage media can be any available media that can be accessed by the computing device 710, and can include, for example, both volatile and non-volatile media, and removable and/or non-removable media. In one aspect, the memory 730 can include computer-readable media in the form of volatile memory, such as random access memory (RAM), and/or non-volatile memory, such as read-only memory (ROM).

As is illustrated in FIG. 7, the memory 730 can include functionality instructions storage 734 and functionality information storage 738. The functionality instructions storage 734 can include computer-accessible instructions that, in response to execution (by at least one of the processor(s) 714), can implement one or more of the functionalities of the technologies disclosed herein. The computer-accessible instructions can embody, or can include, one or many software components illustrated as insertion point generation component(s) 736. In one scenario, execution of at least one component of the insertion point generation component(s) 736 can implement one or several of the methods described herein, such as the example method 600, or both. For instance, such execution can cause a processor (e.g., one of the processor(s) 714) that executes the at least one component to carry out one or a combination of the disclosed example methods. It should be appreciated that, in one aspect, a processor of the processor(s) 714 that executes at least one of the insertion point generation component(s) 736 can retrieve information from or retain information in one or many memory elements 740 in the functionality information storage 738 in order to operate in accordance with the functionality programmed or otherwise configured by the insertion point generation component(s) 736. The one or many memory elements 740 may be referred to as insertion point generation information 740. Such information can include at least one of code instructions, information structures, or the like.

In some embodiments, one or many components of the insertion point generation component(s) 736 can embody, or can be part of, at least one of the segmentation subsystem 110, the scoring subsystem 120, or the file composer unit 130. As such, the one or many components can operate in accordance with, and can provide the functionality of, the segmentation subsystem 110, the scoring subsystem 120, or the file composer unit 130 in accordance with aspects described in this disclosure. In other embodiments, one or many of the insertion point generation component(s) 736 in combination with at least one of the processor(s) 714 can embody or can constitute at least one of the segmentation subsystem 110, the scoring subsystem 120, or the file composer unit 130, and can operate in accordance with, and can provide the functionality of, such units in accordance with aspects described in this disclosure.

At least one of the one or more interfaces 750 (e.g., application programming interface(s)) can permit or otherwise facilitate communication of information between two or more components within the functionality instructions storage 734. The information that is communicated by the at least one interface can result from implementation of one or many operations in a method of this disclosure. In some embodiments, the functionality instructions storage 734 or the functionality information storage 738, or both, can be embodied in or can include removable/non-removable, and/or volatile/non-volatile computer storage media.

At least a portion of at least one of insertion point generation component(s) 736 or insertion point generation information 740 can program or otherwise configure one or many of the processors 714 to operate at least in accordance with the functionality described herein. One or many of the processor(s) 714 can execute at least one of the insertion point generation component(s) 736 and utilize at least a portion of the information in the functionality information storage 738 in order to generate points of insertion of directed content into a video asset in accordance with one or more aspects described herein.

It should be appreciated that, in some scenarios, the functionality instruction(s) storage 734 can embody, or can include, a computer-readable non-transitory storage medium having computer-accessible instructions that, in response to execution, cause at least one processor (e.g., one or several of the processor(s) 714) to perform a group of operations including the operations or blocks described in connection with the disclosed methods.

In addition, the memory 730 can include computer-accessible instructions and information (e.g., data, metadata, and/or programming code instructions) that permit or facilitate the operation and/or administration (e.g., upgrades, software installation, any other configuration, or the like) of the computing device 710. Accordingly, as illustrated, the memory 730 can include a memory element 742 (labeled operating system (OS) instruction(s) 742) that contains one or more program modules that embody or include one or more operating systems, such as Windows operating system, Unix, Linux, Symbian, Android, Chromium, and substantially any OS suitable for mobile computing devices or tethered computing devices. In one aspect, the operational and/or architectural complexity of the computing device 710 can dictate a suitable OS. The memory 730 also includes system information storage 746 having data, metadata, and/or programming code that permits or facilitates the operation and/or administration of the computing device 710. Elements of the OS instruction(s) 742 and the system information storage 746 can be accessible or can be operated on by at least one of the processor(s) 714.

It should be recognized that while the functionality instructions storage 734 and other executable program components, such as the OS instruction(s) 742, are illustrated herein as discrete blocks, such software components can reside at various times in different memory components of the computing device 710, and can be executed by at least one of the processor(s) 714. In certain scenarios, an implementation of the directed content insertion component(s) 736 can be retained on or transmitted across some form of computer-readable media.

The computing device 710 and/or one of the computing device(s) 770 can include a power supply (not shown), which can power up components or functional elements within such devices. The power supply can be a rechargeable power supply, e.g., a rechargeable battery, and can include one or more transformers to achieve a power level suitable for the operation of the computing device 710 and/or one of the computing device(s) 770, and components, functional elements, and related circuitry therein. In certain scenarios, the power supply can be attached to a conventional power grid to recharge and ensure that such devices can be operational. In one aspect, the power supply can include an I/O interface (e.g., one of the network adapter(s) 718) to connect operationally to the conventional power grid. In another aspect, the power supply can include an energy conversion component, such as a solar panel, to provide additional or alternative power resources or autonomy for the computing device 710 and/or one of the computing device(s) 770.

The computing device 710 can operate in a networked environment by utilizing connections to one or many remote computing devices 770. As an illustration, a remote computing device can be a personal computer, a portable computer, a server, a router, a network computer, a peer device or other common network node, or similar. As is described herein, connections (physical and/or logical) between the computing device 710 and a computing device of the one or many remote computing devices 770 can be made via one or more traffic and signaling pipes 760, which can include wired link(s) and/or wireless link(s) and several network elements (such as routers or switches, concentrators, servers, and the like) that form a personal area network (PAN), a local area network (LAN), a metropolitan area network (MAN), a wide area network (WAN), and/or other networks (wireless or wired) having different footprints. Such networking environments can be configured in dwellings, offices, enterprise-wide computer networks, intranets, local area networks, and wide area networks.

In one or more embodiments, one or more of the disclosed methods can be practiced in distributed computing environments, such as grid-based environments, where tasks can be performed by remote processing devices (computing device(s) 770) that are functionally coupled (e.g., communicatively linked or otherwise coupled) through a network having traffic and signaling pipes and related network elements. In a distributed computing environment, in one aspect, one or more software components (such as program modules) can be located in both a local computing device 710 and at least one remote computing device.

The disclosed operational environments (e.g., system(s), device(s), etc.) and methods may take the form of an entirely hardware embodiment, an entirely software embodiment, or an embodiment combining hardware and software features. Furthermore, the methods and systems may take the form of a computer program product on a computer-readable non-transitory storage medium having computer-accessible instructions (e.g., computer-readable and/or computer-executable instructions), such as computer software, embodied in the computer-readable non-transitory storage medium. Any suitable computer non-transitory storage medium may be utilized to form the computer program product.

Embodiments of the operational environments and methods are described herein with reference to block diagrams and flowchart illustrations of methods, systems, apparatuses and computer program products. It can be understood that each block of the block diagrams and flowchart illustrations, and combinations of blocks in the block diagrams and flowchart illustrations, respectively, can be implemented by computer-accessible instructions. In certain implementations, the computer-accessible instructions may be loaded or otherwise incorporated into a general-purpose computer, special purpose computer, or other programmable information processing apparatus to produce a particular machine, such that the operations or functions specified in the flowchart block or blocks can be implemented in response to execution at the computer or processing apparatus.

Unless otherwise expressly stated, it is in no way intended that any protocol, procedure, process, or method set forth herein be construed as requiring that its acts or steps be performed in a specific order. Accordingly, where a process or method claim does not actually recite an order to be followed by its acts or steps or it is not otherwise specifically recited in the claims or descriptions of the subject disclosure that the steps are to be limited to a specific order, it is in no way intended that an order be inferred, in any respect. This holds for any possible non-express basis for interpretation, including: matters of logic with respect to arrangement of steps or operational flow; plain meaning derived from grammatical organization or punctuation; the number or type of embodiments described in the specification or annexed drawings, or the like.

As used in this application, the terms "component," "environment," "system," "architecture," "platform," "interface," "unit," "module," and the like are intended to refer to a computer-related entity or an entity related to an operational apparatus with one or more specific functionalities. Such entities may be either hardware, a combination of hardware and software, software, or software in execution. As an example, a component may be, but is not limited to being, a process running on a processor, a processor, an object, an executable portion of software, a thread of execution, a program, and/or a computing device. For example, both a software application executing on a computing device and the computing device can be a component. One or more components may reside within a process and/or thread of execution. A component may be localized on one computing device or distributed between two or more computing devices. As described herein, a component can execute from various computer-readable non-transitory media having various data structures stored thereon. Components can communicate via local and/or remote processes in accordance, for example, with a signal (either analogic or digital) having one or more data packets (e.g., data from one component interacting with another component in a local system, distributed system, and/or across a network such as a wide area network with other systems via the signal). As another example, a component can be an apparatus with specific functionality provided by mechanical parts operated by electric or electronic circuitry that is controlled by a software application or firmware application executed by a processor, wherein the processor can be internal or external to the apparatus and can execute at least a part of the software or firmware application. As yet another example, a component can be an apparatus that provides specific functionality through electronic components without mechanical parts, the electronic components can include a processor therein to execute software or firmware that confers at least in part the functionality of the electronic components. An interface can include input/output (I/O) components as well as associated processor, application, and/or other programming components. The terms "component," "environment," "system," "architecture," "platform," "interface," "unit," "module" can be utilized interchangeably and can be referred to collectively as functional elements.

In the present specification and annexed drawings, reference to a "processor" is made. As utilized herein, a processor can refer to any computing processing unit or device comprising single-core processors; single-processors with software multithread execution capability; multi-core processors; multi-core processors with software multithread execution capability; multi-core processors with hardware multithread technology; parallel platforms; and parallel platforms with distributed shared memory. A processor can constitute a central processing unit (CPU), a graphics processing unit (GPU), or a tensor processing unit (TPU). Additionally, a processor can refer to an integrated circuit (IC), an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. A processor can be implemented as a combination of computing processing units. In certain embodiments, processors can utilize nanoscale architectures such as, but not limited to, molecular and quantum-dot based transistors, switches and gates, in order to optimize space usage or enhance performance of user equipment.

In addition, in the present specification and annexed drawings, terms such as "store," "storage," "data store," "data storage," "memory," "repository," and substantially any other information storage component relevant to operation and functionality of a component of the disclosure, refer to "memory components," entities embodied in a "memory," or components forming the memory. It can be appreciated that the memory components or memories described herein embody or include non-transitory computer storage media that can be readable or otherwise accessible by a computing device. Such media can be implemented in any methods or technology for storage of information such as computer-readable instructions, information structures, program modules, or other information objects. The memory components or memories can be either volatile memory or non-volatile memory, or can include both volatile and non-volatile memory. In addition, the memory components or memories can be removable or non-removable, and/or internal or external to a computing device or component. Example of various types of non-transitory storage media can include solid state drives, hard-disc drives, zip drives, CD-ROM, digital versatile disks (DVD) or other optical storage, magnetic cassettes, magnetic tape, magnetic disk storage or other magnetic storage devices, flash memory cards or other types of memory cards, cartridges, or any other non-transitory medium suitable to retain the desired information and which can be accessed by a computing device.

As an illustration, non-volatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The disclosed memory components or memories of operational environments described herein are intended to include one or many of these and/or any other suitable types of memory.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language generally is not intended to imply that features, elements, and/or operations are in any way required for one or more implementations or that one or more implementations necessarily include logic for deciding, with or without user input or prompting, whether these features, elements, and/or operations are included or are to be performed in any particular implementation.

What has been described herein in the present specification and annexed drawings includes examples of systems, devices, and techniques for generation of points of insertion of directed content into a video asset. It is, of course, not possible to describe every conceivable combination of elements and/or method for purposes of describing the various features of this disclosure, but it can be recognized that many further combinations and permutations of the disclosed features are possible. Accordingly, it may be apparent that various modifications can be made to the disclosure without departing from the scope or spirit thereof. In addition, or in the alternative, other embodiments of the disclosure may be apparent from consideration of the specification and annexed drawings, and practice of the disclosure as presented herein. It is intended that the examples put forward in the specification and annexed drawings be considered, in all respects, as illustrative and not restrictive. Although specific terms are employed herein, they are used in a generic and descriptive sense only and not for purposes of limitation.

What is claimed is:

1. A method, comprising:

receiving, by a computing system comprising at least one processor, audio data embedded in an audio channel within a digital feature motion picture having a defined running time;

receiving, by the computing system, image data embedded in a video channel within the digital feature motion picture;

determining, by the computing system, multiple time offsets within the defined running time by applying a first machine-learning model to the audio data, a first time offset of the multiple time offsets defining a boundary between a first segment of the digital feature motion picture and a second segment of the digital feature motion picture, wherein the first time offset identifies a first time interval elapsed since a beginning of the digital feature motion picture, and wherein the first machine-learning model yields a probability of the first segment being a first loud-volume portion of the digital feature motion picture and a probability of the second segment being a soft-volume portion of the digital feature motion picture;

generating, by the computing system, using the image data, respective pairs of video clips for the multiple time offsets, a first pair of video clips for the first time offset includes (i) a pre-transition video clip spanning a defined time interval prior to the first time offset and (ii) a post-transition video clip spanning the defined time interval after the first time offset;

generating, by the computing system, visual features pertaining to the respective pairs of video clips, the visual features including first visual features pertaining to the pre-transition video clip and second visual features pertaining to the post-transition video clip;

generating, by the computing system, aural features pertaining to the respective pairs of video clips, the aural features including first aural features pertaining to the pre-transition video clip and second aural features pertaining to the post-transition video clip;

generating, by the computing system, language features for the respective pairs of video clips, the language features including first language features pertaining to the pre-transition video clip and second language features pertaining to the post-transition video clip;

generating, by the computing system, respective scores for the multiple time offsets by applying a second machine-learning model to the visual features, the aural features, and the language features, a first score of the respective scores represents an assessment of suitability to insert, during playback, directed content into the digital feature motion at the first time offset;

determining that a defined time offset of the multiple time offsets has a defined score greater than a threshold value; and adding the defined time offset to a file retained in data storage, the file including defined time offsets having respective defined scores greater than the threshold value.

2. The method of claim 1, wherein the pre-transition video clip comprises first video frames, and wherein the post-transition video clip comprises second video frames, the generating the visual features comprises:

generating the first visual features by aggregating first defined image features for each image in the pre-transition video clip, the first defined image features determined using a neural network pre-trained for image recognition; and generating the second aural features by aggregating second defined image features for each image in the post-transition video clip, the first defined image features determined using the neural network.

3. The method of claim 1, wherein the pre-transition video clip comprises first audio data defining a first audio segment, and wherein the post-transition video clip comprises second audio data defining a second audio segment, the generating the aural features comprises, generating the first aural features by determining at least one of an energy feature of the first audio data or a Mel frequency spectral coefficient (MFCC) of the first audio data; and generating the second aural features by determining at least one of an energy feature of the second audio data or an MFCC of the second audio data.

4. The method of claim 3, wherein the generating the language features comprises, generating the first language features by,
causing one or more service devices to generate a first transcription corresponding to speech embedded in the first audio data; and
applying a pre-trained bidirectional encoder representation for transformers (BERT) model to the transcription; and generating the second language features by,
causing one or more service devices to generate a second transcription corresponding to speech embedded in the second audio data; and
applying the pre-trained BERT model to the second transcription.

5. The method of claim 1, further comprising:

receiving, by the computing system, a series of human-generated time offsets for the digital feature motion picture;

generating, by the computing system, using the image data, respective second pairs of video clips for the series of human-generated time offsets;

generating, by the computing system, third visual features pertaining to the respective second pairs of video clips;

generating, by the computing system, third aural features pertaining to the respective second pairs of video clips;

generating, by the computing system, third language features for the respective second pairs of video clips;

generating, by the computing system, respective second scores for the series of human-generated time offsets by applying the second machine-learning model to the third visual features, the third aural features, and the third language features;

determining, by the computing system, that a second defined score of the respective second scores is less than the defined score;

removing, by the computing system, a defined human-generated time offset corresponding to the second defined score from of the series of human-generated time offsets; and adding, by the computing system, the defined time offset of the multiple time offsets to the series of human-generated time offsets.

23

6. A method, comprising:
receiving, by a computing system comprising at least one processor, audio data corresponding to a video asset spanning a defined time interval;
receiving, by the computing system, image data corresponding to the video asset;
determining, by the computing system, multiple time offsets within the defined time interval by applying a segmentation model to the audio data, a first time offset of the multiple time offsets defining a boundary between a first segment of the video asset and a second segment of the video asset;
generating, by the computing system, using the image data, respective pairs of video clips for the multiple time offsets;
generating, by the computing system, visual features pertaining to the respective pairs of video clips;
generating, by the computing system, aural features pertaining to the respective pairs of video clips;
generating, by the computing system, language features pertaining to the respective pairs of video clips;
generating, by the computing system, respective scores for the multiple time offsets by applying a scoring model to the visual features, the aural features, and the language features, a first score of the respective scores represents an assessment of suitability to insert directed content into the video asset at the first time offset, wherein the directed content comprises digital media intended for a defined audience;
selecting, by the computing system, defined time offsets from the multiple time offsets using the respective scores; and
generating a file that contains the selected subgroup of the multiple time offsets.

7. The method of claim 6, wherein the selecting comprises determine that a first one of the defined time offsets has a defined score that exceeds a defined threshold value.

8. The method of claim 6, wherein the selecting comprises:
generating a ranking of the respective scores;
determining a defined number of particular time offsets from the multiple time offsets that meet or exceed a threshold placement within the ranking; and
identifying the defined number of particular time offsets as the defined time offsets.

9. The method of claim 6, further comprising operating on the defined time offsets prior to the generating the file, the operating including removing a particular time offset from the defined time offsets, wherein the particular time offset identifies time interval from a beginning of the video asset that is less than a defined threshold period.

10. The method of claim 6, wherein the segmentation model comprises a machine-learning model that yields a probability of the first segment being a first loud-volume portion of the digital feature motion picture and a probability of the second segment being a soft-volume portion of the video asset.

11. The method of claim 6, wherein a first pair of video clips for the first time offset includes (i) a pre-transition video clip spanning a defined time interval prior to the first time offset and (ii) a post-transition video clip spanning the defined time interval after the first time offset, the generating the visual features comprises:
generating the first visual features by aggregsting first defined image features for each image in the pre-transition video clip, the first defined image features determined using a neural network pre-trained for image recognition; and
generating the second aural features by aggregating second defined image features for each image in the post-transition video clip, the first defined image features determined using the neural network.

12. The method of claim 6, wherein a first pair of video clips for the first time offset includes (i) a pre-transition video clip spanning a defined time interval prior to the first time offset and (ii) a post-transition video clip spanning the defined time interval after the first time offset, and
wherein the pre-transition video clip comprises first audio data defining a first audio segment, and wherein the post-transition video clip comprises second audio data defining a second audio segment, the generating the aural features comprises,
generating the first aural features by determining at least one of a time-domain feature of the first audio data or a frequency-domain feature of the first audio data; and
generating the second aural features by determining at least one of a time-domain feature of the second audio data or a frequency-domain feature of the second audio data.

13. The method of claim 12, wherein the time-domain feature comprises one of short-energy feature, and wherein the frequency-domain feature comprises one of a Mel frequency spectral coefficient, power spectral distribution, or a spectral centroid.

14. The method of claim 12, wherein the generating the language features comprises,
generating the first language features by,
causing one or more service devices to generate a first transcription corresponding to speech embedded in the first audio data; and
applying a pre-trained bidirectional encoder representation for transformers (BERT) model to the transcription; and
generating the second language features by,
causing the one or more service devices to generate a second transcription corresponding to speech embedded in the second audio data; and
applying the pre-trained BERT model to the second transcription.

15. The method of claim 6, further comprising:
receiving, by the computing system, a series of human-generated time offsets for the video asset;
generating, by the computing system, using the image data, respective second pairs of video clips for the series of human-generated time offsets;
generating, by the computing system, third visual features pertaining to the respective second pairs of video clips;
generating, by the computing system, third aural features pertaining to the respective second pairs of video clips;
generating, by the computing system, third language features for the respective second pairs of video clips;
generating, by the computing system, respective second scores for the series of human-generated time offsets by applying the scoring model to the third visual features, the third aural features, and the third language features;
determining that a second defined score of the respective second scores is less than the defined score;
removing a defined human-generated time offset corresponding to the second defined score from the series of human-generated time offsets; and adding the defined time offset of the multiple time offsets to the series of human-generated time offsets.

16. A computing system, comprising:
at least one processor; and
at least one memory device having computer-executable instructions stored thereon that, in response to execution by the at least one processor, cause the computing system to:
receive audio data corresponding to a video asset;
receive image data corresponding to the video asset;
determine multiple time offsets within a duration of the video asset by applying a segmentation model to the audio data, wherein a first time offset of the multiple time offsets defines a boundary between a first segment of the video asset and a second segment of the video asset;
generate, using the image data, respective pairs of video clips for the multiple time offsets;
generate visual features pertaining to the respective pairs of video clips;
generate aural features pertaining to the respective pairs of video clips;
generating language features pertaining to the respective pairs of video clips;
generate respective scores for the multiple time offsets by applying a scoring model to the visual features, the aural features, and the language features, a first score of the respective scores represents an assessment of suitability to insert directed content into the video asset at the first time offset;
selecting, by the computing system, defined time offsets from the multiple time offsets using the respective scores; and
generating a file that contains the selected subgroup of the multiple time offsets.

17. The system of claim 16, wherein the segmentation model comprises a machine-learning model that yields a probability of the first segment being a first loud-volume portion of the digital feature motion picture and a probability of the second segment being a soft-volume portion of the digital feature motion picture.

18. The system of claim 16, wherein a first pair of video clips for the first time offset includes (i) a pre-transition video clip spanning a defined time interval prior to the first time offset and (ii) a post-transition video clip spanning the defined time interval after the first time offset, the generating the visual features comprises:
generating the first visual features by aggregating first defined image features for each image in the pre-transition video clip, the first defined image features determined using a neural network pre-trained for image recognition; and
generating the second aural features by aggregating second defined image features for each image in the post-transition video clip, the first defined image features determined using the neural network.

19. The system of claim 16, wherein a first pair of video clips for the first time offset includes (i) a pre-transition video clip spanning a defined time interval prior to the first time offset and (ii) a post-transition video clip spanning the defined time interval after the first time offset, and
wherein the pre-transition video clip comprises first audio data defining a first audio segment, and wherein the post-transition video clip comprises second audio data defining a second audio segment, and further wherein generating the aural features comprises,
generating the first aural features by determining at least one of a time-domain feature of the first audio data or a frequency-domain feature of the first audio data; and
generating the second aural features by determining at least one of a time-domain feature of the second audio data or a frequency-domain feature of the second audio data.

20. The system of claim 19, wherein generating the language features comprises,
generating the first language features by,
causing one or more service devices to generate a first transcription corresponding to speech embedded in the first audio data; and
applying a pre-trained bidirectional encoder representation for transformers (BERT) model to the transcription; and
generating the second language features by,
causing the one or more service devices to generate a second transcription corresponding to speech embedded in the second audio data; and
applying the pre-trained BERT model to the second transcription.

* * * * *